METHOD FOR PREVENTING PLASTICIZER BLEEDING ON POLYVINYL CHLORIDE SHAPED ARTICLES

[75] Inventors: Michihiko Asai, Fujisawa; Yoshio Suda, Hachioji; Kiyoshi Imada, Omiya; Susumu Ueno; Hirokazu Nomura, both of Ibaragi, all of Japan

[73] Assignees: Agency of Industrial Science and Technology; Shin-Etsu Chemical Co., Ltd., both of Japan

[21] Appl. No.: 51,150

[22] Filed: Jun. 22, 1979

[30] Foreign Application Priority Data

Jun. 26, 1978 [JP] Japan .................................. 53-77295

[51] Int. Cl.² .......................... C08L 27/22; C08K 5/54
[52] U.S. Cl. .............................. 525/288; 260/30.6 R; 260/31.2 R; 260/31.6; 260/31.8 R; 260/31.8 S; 260/31.8 M
[58] Field of Search .................. 525/284; 260/31.8 R, 260/31.8 S, 31.8 M

[56] References Cited

U.S. PATENT DOCUMENTS

| 3,711,570 | 1/1973 | Lewis | 525/288 |
| 4,155,899 | 5/1979 | Lemper et al. | 525/254 X |

Primary Examiner—Carman J. Seccuro
Attorney, Agent, or Firm—McGlew & Tuttle

[57] ABSTRACT

A novel method is proposed for preventing bleeding of plasticizers on the surface of shaped articles of plasticized polyvinyl chloride resins. The method comprises blending a limited amount of an organosilane compound represented by the general formula

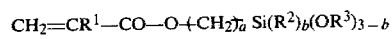

in which $R^1$ and $R^3$ are each a hydrogen atom or an alkyl group, $R^2$ is a monovalent hydrocarbon group, a is an integer from 1 to 6 and b is a number of 0, 1 or 2 with the polyvinyl chloride resin prior to fabrication of the resin into shaped articles, fabricating the resin admixed with the organosilane compound into a desired shaped article, and subjecting the shaped article to a treatment with low temperature plasma of a gas. Carbon monoxide is preferred as the gas for plasma atmosphere.

7 Claims, No Drawings

METHOD FOR PREVENTING PLASTICIZER BLEEDING ON POLYVINYL CHLORIDE SHAPED ARTICLES

BACKGROUND OF THE INVENTION

The present invention relates to a method for preventing bleeding of plasticizers on the surface of shaped articles of a plasticized polyvinyl chloride resin.

Polyvinyl chloride resins are one of the most important classes of thermoplastic synthetic resins used for manufacturing various kinds of shaped articles useful in a very wide field of applications. Shaped articles of polyvinyl chloride resins are classified into rigid type ones and flexible type ones according to the absence and presence of a substantial amount of a plasticizer in the resin compositions. Namely, the rigidity or flexibility of shaped articles of a polyvinyl chloride resin can be controlled by the incorporation of a plasticizer such as a phthalic ester and the thus plasticized polyvinyl chloride resins are fabricated into various kinds of flexible articles including films, sheets, synthetic leathers, tubes, hoses, bags, packings, covering materials and the like directed to the uses in the fields of medical and sanitary wares, cooking wares, wrapping materials for foodstuffs, insulation of electric wires, materials used in agricultural plant growing, materials for buildings and the like.

One of the most difficult problems involved in the shaped articles of plasticized polyvinyl chloride resins is the so-called bleeding of the plasticizer contained therein which is a phenomenon that the plasticizer contained in the body of the shaped article migrates with time toward the surface of the article and is lost by evaporation into the atmosphere. This phenomenon of bleeding of the plasticizer as well as of the other additives contained in the shaped articles is so remarkable that not only the beautifulness in appearance but also various mechanical or physical properties are detrimentally affected giving rise to a shortened serviceable life of the articles.

The bleeding phenomenon is especially undesirable when the shaped article is used in a medical application such as a bag or container of blood for transfusion or used in contact with foodstuffs because the toxicity of the plasticizer and other additives may thereby limit the usage of polyvinyl chloride resins.

Various attempts have been made to decrease the bleeding of plasticizers and other additives on the surface of articles including techniques utilizing the irradiation with ionizing radiations or ultraviolet light, corona discharge at a relatively high gas pressure, e.g. larger than 100 Torr, and treatment with chemicals. These prior methods are to some extent effective for improving various surface properties of articles of polyvinyl chloride resins such as heat resistance, anti-solvent resistance, affinity with water, electrostatic charging, printability and the like but the effectivness of these method in preventing plasticizer bleeding is rather small. Moreover, it is sometimes unavoidable that certain desirable properties of the shaped articles of polyvinyl chloride resins are adversely affected by these methods.

For example, the irradiation with an ionizing radiation produces crosslinks not only in the surface layer but also in the body of the article and its attendant high energy may result in undesirable change in the mechanical properties of the plasticized polyvinyl chloride resins. The irradiation with ultraviolet light adversely affects the coloring of the surface due to the oxidative degradation taking place in the surface layer of the articles. The treatment with corona discharge is not practicable due to the large difficulty in the process control owing to the rather unstable nature of the discharge. Further, chemical means are not free from the problems of erosion by the chemicals or poor adhesiveness or durability of coating compositions.

SUMMARY OF THE INVENTION

The present invention has been established as a result of the extensive investigations carried out by the inventors on the above described technical problems to prevent bleeding of a plasticizer on the surface of a shaped article of plasticized polyvinyl chloride resins and the method of the invention comprises the steps of (a) blending from 0.1 to 20 parts by weight of an organosilane compound represented by the general formula $$CH_2=CR^1-CO-O-(CH_2)_aSi(R^2)_b(OR^3)_{3-b} \qquad (I)$$

where $R^1$ and $R^3$ are each a hydrogen atom or an alkyl group having 1 to 4 carbon atoms, $R^2$ is a hydrogen atom or a monovalent hydrocarbon group, a is an integer from 1 to 6 inclusive and b is a number of 0, 1 or 2, with 100 parts by weight of a polyvinyl chloride resin prior to fabrication of the polyvinyl chloride resin into a shaped article, (b) fabricating the polyvinyl chloride resin admixed with the organosilane compound into a shaped article, and (c) subjecting the shaped article to a treatment with low temperature plasma of a gas.

DETAILED DESCRIPTION OF THE PREFERRED EMBODIMENTS

The polyvinyl chloride resins used in the above step (a) are not particularly limited to certain specific types of polyvinyl choride resins including homopolymers of vinyl chloride of various average degrees of polymerization as well as copolymers of vinyl chloride with one or more of copolymerizable comonomers insofar as the main component, say, 50% by weight or more, of the copolymer is vinyl chloride. The comonomers copolymerizable with vinyl chloride are well known in the art and exemplified by vinyl esters such as vinyl acetate, vinyl ethers such as vinylethyl ether, acrylic and methacrylic acids and esters thereof, maleic and fumaric acids and esters thereof, maleic anhydride, aromatic vinyl compounds such as styrene, vinylidene halides such as vinylidene chloride, acrylonitrile, methacrylonitrile, olefins such as ethylene and propylene and the like.

In step (a) of the inventive method, an organosilane compound represented by the above given general formula (I) is blended with the polyvinyl chloride resin in a limited amount prior to fabrication of the resin into shaped articles. In the formula, $R^1$ is a hydrogen atom or an alkyl group having 1 to 4 carbon atoms and, when $R^1$ is a hydrogen atom, the organosilane compound is an acryloxy group-containing organosilane while, when $R^1$ is a methyl group, the silane is a methacryloxy group-containing organosilane compound. It is preferable that $R^1$ is a methyl group from the standpoint of availability of the organosilane compound. The number a is an integer from 1 to 6 inclusive corresponding to methylene to hexylene groups, respectively. In particular, the number a is preferably 3 giving a methacryloxypropyl group bonded to the silicon atom.

The symbol $R^2$ stands for a monovalent hydrocarbon group exemplified by alkyl groups such as methyl, ethyl and propyl groups, aryl groups such as phenyl group and alkenyl groups such as vinyl group. No particular preference is given among them. The symbol b stands for a number of 0, 1 or 2 so that, when b is 0, no $R^2$ groups are bonded to the silicon atom. In other words, it is essential that the silicon atom has at least one ($OR^3$) group bonded thereto.

The definition of the group $R^3$ is the same as that of $R^1$ and, when $R^3$ is an alkyl group, the silane is an organosilane containing at least one alkoxy group, e.g. methoxy and ethoxy groups. On the other hand, the organosilane compound in which the group $R^3$ is a hydrogen atom, the group $-OR^3$ is a hydroxy group and such hydroxy-containing organosilane is prepared by hydrolyzing the above mentioned alkoxy-containing organosilane.

In a typical example of the organosilane compound in conformity with the general formula (I) and the definitions of the symbols $R^1$, $R^2$, $R^3$, a and b is methacryloxypropyl trimethoxysilane methacryloxypropyl triethoxysilane and methacryloxypropyl tripropoxysilane. As is mentioned above, the corresponding hydroxy-containing organosilane compound of the above named alkoxy-containing silane and partial condensation products thereof are also useful for the purpose.

The amount of the organosilane compound of the above formula (I) is in the range from 0.1 to 20 parts by weight or, preferably, from 1 to 10 parts by weight per 100 parts by weight of the polyvinyl chloride resin since smaller amounts than above cannot give sufficient effects of preventing bleeding of the plasticizer while larger amounts than above may have some adverse effects on the properties of the shaped articles of the polyvinyl chloride resin.

Blending of the above described organosilane compound with the polyvinyl chloride resin is carried out in a suitable blending machine such as a roller mill, preferably, at an elevated temperature either simultaneously with, prior to or after the blending of the plasticizer and other optional additives.

The plasticizers, of which the bleeding on the surface of shaped articles can be effectively prevented by the inventive method, include various classes such as esters of phthalic acid exemplified by dioctyl phthalate, dibutyl phthalate and the like, esters of an aliphatic dibasic carboxylic acid exemplified by dioctyl adipate, dibutyl sebacate and the like, glycol esters exemplified by esters of pentaerithritol, diethyleneglycol dibenzoate and the like, esters of an aliphatic monobasic carboxylic acid exemplified by acetylricinoleic acid and the like, esters of phosphoric acid exemplified by tricresyl phosphate, triphenyl phosphate and the like, epoxidated fatty acids exemplified by epoxidated soybean oil, epoxidated linseed oil and the like, bisphenolbased epoxy resins, esters of citric acid exemplified by acetyltributyl citrate, acetyltrioctyl citrate and the like, trialkyl trimellitate, tetren-octyl pyromellitate and polypropylene adipate as well as other types of polyester plasticizers. The amount of the plasticizer in the plasticized polyvinyl chloride resin composition is usually in the range from 30 to 70 parts by weight per 100 parts by weight of the resin although the amount may be reduced when the composition contains a substantial amount of rubbery elastomers.

The effectiveness of the inventive method is not impaired by the presence of various additives other than the plasticizer including fillers, anti-oxidants, ultraviolet light absorbers, stabilizers, anti-static agents, anti-fogging agents, pigments, dyestuffs, crosslinking aids and the like. Bleeding or blooming of these additives is also prevented by the inventive method insofar as the amounts thereof are not excessively large beyond ordinary formulations. In particular, several types of rubbery elastomers may be incorporated into the resin composition to improve the mechanical properties of the shaped articles if the amount thereof is not excessively large, say, less than 50 parts by weight per 100 parts by weight of the polyvinyl chloride resin.

The polyvinyl chloride resin composition thus obtained is then fabricated into a shaped article in step (b) of the inventive method. The techniques of fabrication are not limitative and any conventional methods can be applied according to the shape of the desired article and the moldability of the resin composition including extrusion molding, injection molding, calendering, inflation, blow molding, vacuum forming, compression molding and the like. The shapes of the articles are also not limitative although articles with complicated shapes, for example, with concavity may require specific elaboration in order to ensure uniform effect of treatment with low temperature plasma in the subsequent step (c) of the inventive method.

The shaped article obtained in the above step (b) of the inventive method is then subjected to a treatment with low temperature plasma. Low temperature plasma here implied is well known in the art as a gaseous atmosphere full of electrically charged species where the temperature of the gaseous atmosphere is not excessively high in comparison with the ambient temperature irrespective of the energies of the charged species per se. Low temperature plasma is produced mainly by glow discharge in a gaseous atmosphere of a pressure in the range from 0.001 to 10 Torr where the frequency of the electric power supply for the discharge is not limitative ranging from direct current to the microwave region. In particular, a frequency of the so-called high frequency region is recommended due to the possibility of obtaining stable plasma discharge. For example, a frequency of 13.56 MHz or 27.12 MHz is recommended since these frequencies are relatively free from statutory regulations for radio waves.

The shapes and arrangement of the electrodes are not limited insofar as a stable plasma discharge can be ensured within the space in which the surface of the shaped article is treated with, i.e. exposed to, the plasma atmosphere. Thus, a pair of inside electrodes, a pair of exterior electrodes and a coiled electrode may be used according to partiular types of the apparatuses for plasma generation. The electrodes may be connected to the high frequency generator either by capacitive coupling or inductive coupling.

The intensity or power density of the low temperature plasma and the time required for the plasma treatment are interrelated parameters but extreme difficulties are encountered in explicitly defining the power density of low temperature plasma due to the very complicated nature of the plasma atmosphere beyond the understanding in the present status of the art. Therefore, it is the best approach that the time for the plasma treament is determined in advance by a careful preparatory experiment in which several parameters including the supplied electric power are selected according to the specific purposes. With a power density obtained in most of the currently available apparatuses for plasma generation, a time from a few seconds to several tens of minutes is usually sufficient for obtaining the objective antistatic effect of the invention. In any case, it is a minimum requirement that the surface of the shaped articles never undergo thermal degradation from the heat evolved by the discharge.

The other parameters to be taken into consideration in the plasma treatment are the kind of the gaseous constituents and the pressure of the gaseous atmosphere. The pressure of the gaseous atmosphere within the apparatus for plasma generation should be maintaind in a range from 0.001 to 10 Torr or, preferably, from 0.01 to 1.0 Torr in order to ensure stability of the plasma discharge. The gases filling the apparatus under the above specified pressure is either inorganic or organic as exemplified by helium, neon, argon, nitrogen, nitrous oxide, nitrogen dioxide, oxygen, air, carbon monoxide, carbon dioxide, hydrogen, halogens, e.g. chlorine, and halogen compounds, e.g. hydrogen chloride, as well as olefins, e.g. ethylene and propylene, halogenated hydrocarbons, e.g. fluorocarbons, aromatic hydrocarbons, e.g. benzene, heterocyclic organic compounds, e.g. pyridine, organosilanes and the like. Among the above named gases, the inorganic gases are preferred to the organic ones due to the absence of coloration on the surface of the plasma-treated articles and formation of a powdery polymerized matter. In particular, helium, argon, carbon monoxide, carbon dioxide and hydrogen, especially, carbon monoxide, are preferred because of the higher efficiency by an unknown mechanism. These gases are used either singly or as a mixture of two or more and when a mixed gas is used, it is recommended that one of the components is carbon monoxide.

The shaped articles obtained by the above described procedures of the inventive method have markedly reduced tendency of plasticizer bleeding on the surface and, in addition, the flexibility of the surface layer which constitutes the barrier layer for the plasticizer is not lost because of the adequate density of crosslinks with good heat-sealability and weathering resistance as well as good mechanical properties, especially at low temperatures, such as tensile strength, resistance against scratches, impact strength and the like. Further, the shaped articles obtained by the inventive method have excellent surface properties such as improved affinity with water, less tendency toward stain and good resistance against oils and chemicals.

Following are the examples to illustrate the present invention in further detail, in which parts are all given by parts by weight.

EXAMPLE 1

A resin composition was prepared by intimately blending 100 parts of a homopolymeric polyvinyl chloride resin having an average degree of polymerization of about 1,300 (TK-1300, a trade name by Shin-Etsu Chemical Co., Japan), 50 parts of dioctyl phthalate, 1.5 parts of calcium stearate, 1.5 parts of zinc stearate and 5 parts of methacryloxypropyl trimethoxysilane expressed by the formula

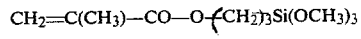

$$CH_2=C(CH_3)-CO-O-(CH_2)_3Si(OCH_3)_3$$

(Shin-Etsu Silicone KBM-503, a trade name by Shin-Etsu Chemical Co., Japan) on a roller mill at 160° C. for 10 minutes and the resin composition was fabricated by press molding at 165° C. into a sheet of 1 mm thickness.

A 10 cm by 10 cm piece of the thus prepared sheet was placed on the lower electrode of 20 cm diameter facing the upper electrode with a distance of 3 cm in an apparatus for plasma generation and low temperature plasma was generated by a high frequency power supply of 50 watts at a frequency of 13.56 MHz for 2 minutes or 3 minutes while the pressure in the apparatus was maintained at 0.2 Torr by passing carbon monoxide gas with simultaneous evacuation with a pump.

The resin sheet thus treated with low temperature plasma on a surface was then subjected to the test for the plasticizer bleeding in the manner described below. Thus, the sheet suitably cut was placed on the bottom of a cylindrical extraction vessel of 100 ml capacity with the plasma-treated surface facing upside and set so as that 26 cm² of the upper surface thereof alone came to contact with the extraction solvent introduced into the vessel and then 50 ml of n-hexane was introduced into the vessel with subsequent shaking at 37° C. for 2 hours. The concentration of the plasticizer in the extract solution was determined by gas chromatography and recorded in mg as set out in Table 1 below.

For comparison, the same experiment was repeated except that the organosilane compound was omitted in the above formulation of the resin composition and the results of the extracted amount of the plasticizer are shown in the same table.

For further comparison, the extraction test with n-hexane was undertaken for the sheets before the plasma treatment to give the results as set out in the same table.

TABLE 1

| Organosilane compound | Time of plasma treatment | | |
|---|---|---|---|
| | 0 minute | 2 minutes | 3 minutes |
| Yes | 132 mg | 16.8 mg | 2.8 mg |
| No | 139.5 mg | 73.4 mg | 20.5 mg |

EXAMPLE 2

A resin composition was prepared by intimately blending 100 parts of a homopolymeric polyvinyl chloride resin having an average degree of polymerization of about 1,000 (TK-1000, a trade name by Shin-Etsu Chemical Co.), 50 parts of dioctyl phthalate, 1.5 parts of calcium stearate, 1.5 parts of zinc stearate and 3 parts of the same organosilane compound as used in Example 1 on a roller mill at 160° C. for 10 minutes and the resin composition was fabricated by press molding at 165° C. into a sheet of 1 mm thickness.

The treatment of the thus prepared sheet with low temperature plasma was carried out in the same manner as in Example 1 except that the pressure of carbon monoxide gas, the electric power supplied to the electrodes and the time of the treatment were 0.5 Torr, 100 watts and 3 minutes or 5 minutes, respectively. The extraction test with n-hexane was carried out in the same manner as in Example 1 with the thus plasma-treated sheet as well as with comparative sheets without the plasma treatment or without the addition of the organosilane compound to give the results set out in Table 2 below.

TABLE 2

| Organosilane compound | Time of plasma treatment | | |
|---|---|---|---|
| | 0 minute | 3 minutes | 5 minutes |
| Yes | 134.2 mg | 3.3 mg | 0.13 mg |
| No | 141.6 mg | 17.2 mg | 5.5 mg |

EXAMPLE 3

Into a flask containing 1 mole of methacryloxypropyl trimethoxysilane chilled at 5° C. was added 1 mole of water dropwise while maintaining the above temperature followed by agitation for 1 hour at room temperature and then heating under reflux for additional 2 hours with subsequent removal of the by-product methanol by distillation under reduced pressure to give a viscous silicone which is a partial hydrolysis-condensation product of the above organosilane compound.

A resin composition was prepared by intimately blending 100 parts of the same polyvinyl chloride resin as used in Example 1, 50 parts of dioctyl phthalate, 1.5 parts of calcium stearate, 1.5 parts of zinc stearate and 3 parts of the above obtained viscous silicone on a roller mill at 160° C. for 10 minutes and the resin composition was fabricated by press molding at 165° C. into a sheet of 1 mm thickness.

The treatment of the thus prepared sheet with low temperature plasma was carried out in the same manner as in Example 1 except that the pressure of carbon monoxide, the electric power supplied to the electrodes and the time of the treatment were 0.35 Torr, 75 watts and 3 minutes or 5 minutes, respectively. The extraction test with n-hexane was carried out in the same manner as in Example 1 with the thus plasma-treated sheet as well as with comparative sheets without the plasma treatment or without the addition of the viscous silicone to give the results set out in Table 3 below.

TABLE 3

| Viscous silicone | Time of plasma treatment | | |
|---|---|---|---|
| | 0 minute | 3 minutes | 5 minutes |
| Yes | 22.6 mg | 2.0 mg | 0.03 mg |
| No | 29.3 mg | 18.9 mg | 4.8 mg |

What we claim is:

1. A method for preventing bleeding of a plasticizer on the surface of a shaped article of a plasticized polyvinyl chloride resin which comprises the steps of
   (a) blending from 0.1 to 20 parts by weight of an organosilane compound represented by the general formula $CH_2=CR^1-CO-O-(CH_2)_aSi(R^2)_b(OR^3)_{3-b}$ in which $R^1$ and $R^3$ are each a hydrogen atom or an alkyl group having from 1 to 4 carbon atoms, $R^2$ is a monovalent hydrocarbon group, $a$ is an integer from 1 to 6 inclusive and $b$ is a number of 0, 1 or 2, with 100 parts by weight of a polyvinyl chloride resin prior to fabrication of the resin into a shaped article,
   (b) fabricating the polyvinyl chloride resin admixed with the organosilane compound into a shaped article, and
   (c) subjecting the shaped article to a treatment with low temperature plasma of a gas.
2. The method as claimed in claim 1 wherein the organosilane compound is methacryloxypropyl trimethoxysilane.
3. The method as claimed in claim 1 wherein the organosilane compound is a partial hydrolysis-condensate of methacryloxypropyl trimethoxysilane.
4. The method as claimed in claim 1 wherein the gas for the low temperature plasma is selected from the group consisting of helium, neon, argon, nitrogen, nitrous oxide, nitrogen dioxide, oxygen, air, carbon monoxide, carbon dioxide, hydrogen, halogens, halogen compounds, olefins, halogenated hydrocarbons, aromatic hydrocarbons, heterocyclic organic compounds and organosilanes.
5. The method as claimed in claim 1 wherein the gas for the low temperature plasma is carbon monoxide.
6. The method as claimed in claim 1 wherein the pressure of the gas is in the range from 0.001 Torr to 10 Torr.
7. The method, as claimed in claim 1, wherein the gas for the low temperature plasma is a mixed gas containing carbon monoxide.